United States Patent
Bing et al.

(10) Patent No.: US 12,032,749 B2
(45) Date of Patent: Jul. 9, 2024

(54) ELECTRONIC KEYBOARD

(71) Applicant: Peratech Holdco Limited, North Yorkshire (GB)

(72) Inventors: Lv Bing, Jiansu (CN); You Dawei, Jiansu (CN); Xu Feng, Jiansu (CN); Cao Jin, Jiansu (CN)

(73) Assignee: Peratech Holdco Limited, North Yorkshire (GB)

( * ) Notice: Subject to any disclaimer, the term of this patent is extended or adjusted under 35 U.S.C. 154(b) by 0 days.

(21) Appl. No.: 17/794,132

(22) PCT Filed: Jan. 19, 2021

(86) PCT No.: PCT/GB2021/000003
§ 371 (c)(1),
(2) Date: Jul. 20, 2022

(87) PCT Pub. No.: WO2021/148770
PCT Pub. Date: Jul. 29, 2021

(65) Prior Publication Data
US 2023/0350500 A1 Nov. 2, 2023

(30) Foreign Application Priority Data
Jan. 20, 2020 (CN) .......................... 202020132796.7

(51) Int. Cl.
*G06F 3/02* (2006.01)
(52) U.S. Cl.
CPC .................................. *G06F 3/0202* (2013.01)

(58) Field of Classification Search
CPC ............................ G06F 3/0202; H01H 13/705
See application file for complete search history.

(56) References Cited

U.S. PATENT DOCUMENTS

| | | | |
|---|---|---|---|
| 5,062,342 A | 11/1991 | Nagatsuma | |
| 9,465,412 B2 | 10/2016 | Belesiu et al. | |
| 9,959,994 B1* | 5/2018 | Liu | H01H 13/78 |
| 2012/0227109 A1* | 9/2012 | Dimuro | A61Q 11/00 |
| | | | 726/22 |
| 2013/0142558 A1 | 6/2013 | Griffin | |
| 2014/0218278 A1* | 8/2014 | Chen | G06F 3/0489 |
| | | | 345/156 |

(Continued)

OTHER PUBLICATIONS

Corresponding International Patent Application No. PCT/GB2021/000003, International Search Report dated Apr. 21, 2021.

(Continued)

*Primary Examiner* — Grant Sitta
(74) *Attorney, Agent, or Firm* — Cooper Legal Group LLC (57) ABSTRACT

An electronic keyboard comprises a plurality of keys and a housing comprising a cavity. The cavity accommodates a circuit board, a pressing layer and at least one pressure sensor arranged therein. Each pressure sensor is provided between a lower portion of the cavity and the circuit board, the pressing layer is moveably connected to each of the keys and the circuit board is provided between the pressing layer and the lower portion. Each pressure sensor is connected to the circuit board, and a force-receiving surface of each pressure sensor aligns with a projection area of the corresponding one of the keys.

11 Claims, 8 Drawing Sheets

(56) References Cited

U.S. PATENT DOCUMENTS

| | | | |
|---|---|---|---|
| 2016/0085315 A1* | 3/2016 | Casparian | H03K 17/975 361/679.08 |
| 2018/0144882 A1* | 5/2018 | Wang | H01H 13/50 |
| 2018/0266900 A1* | 9/2018 | Kim | D03D 11/00 |
| 2021/0294431 A1* | 9/2021 | Clark | G10H 1/0555 |

OTHER PUBLICATIONS

Corresponding International Patent Application No. PCT/GB2021/000003, International Preliminary Report of Patentability dated May 6, 2022.

* cited by examiner

ELECTRONIC KEYBOARD

CROSS REFERENCE TO RELATED APPLICATIONS

This application claims priority from Chinese Utility Model number ZL 2020 2 0132796.7, filed on 20 Jan. 2020, the whole contents of which are incorporated herein by reference.

BACKGROUND OF THE INVENTION

The present invention relates to an electronic keyboard and an electronic device comprising an electronic keyboard.

Electronic devices such as personal or desktop computers which utilize electronic keyboards for providing an input into the electronic devices are widely known and are highly utilized in both home and work environments.

An electronic keyboard of this type provides an instruction and data input device used to operate the electronic device or other equipment.

In known related art, a typical keyboard includes a keyboard substrate, a plurality of keys, and a circuit board. In operation, a user presses the keys so that the circuit board can generate corresponding electrical signals, thereby completing corresponding processing by the corresponding electronic device. In these existing devices, a signal is only generated when a key is pressed, and the corresponding processing is completed on the corresponding electronic device, which reduces the user's experience and is inconvenient for the user's operation.

U.S. Pat. No. 9,465,412 B2 (MICROSOFT TECHNOLOGY LICENSING LLC [US]) published 11 Oct. 2016 describes an input device layer in which a pressure sensitive key assembly is arranged between a force concentrator layer and pads, and a support layer. The pressure sensitive key assembly is positioned across the support layer.

BRIEF SUMMARY OF THE INVENTION

According to a first aspect of the present invention, there is provided an electronic keyboard.

Embodiments of the invention will be described, by way of example only, with reference to the accompanying drawings. The detailed embodiments show the best mode known to the inventor and provide support for the invention as claimed. However, they are only exemplary and should not be used to interpret or limit the scope of the claims. Their purpose is to provide a teaching to those skilled in the art. Components and processes distinguished by ordinal phrases such as "first" and "second" do not necessarily define an order or ranking of any sort.

DETAILED DESCRIPTION OF EMBODIMENTS OF THE INVENTION

Figure 1:
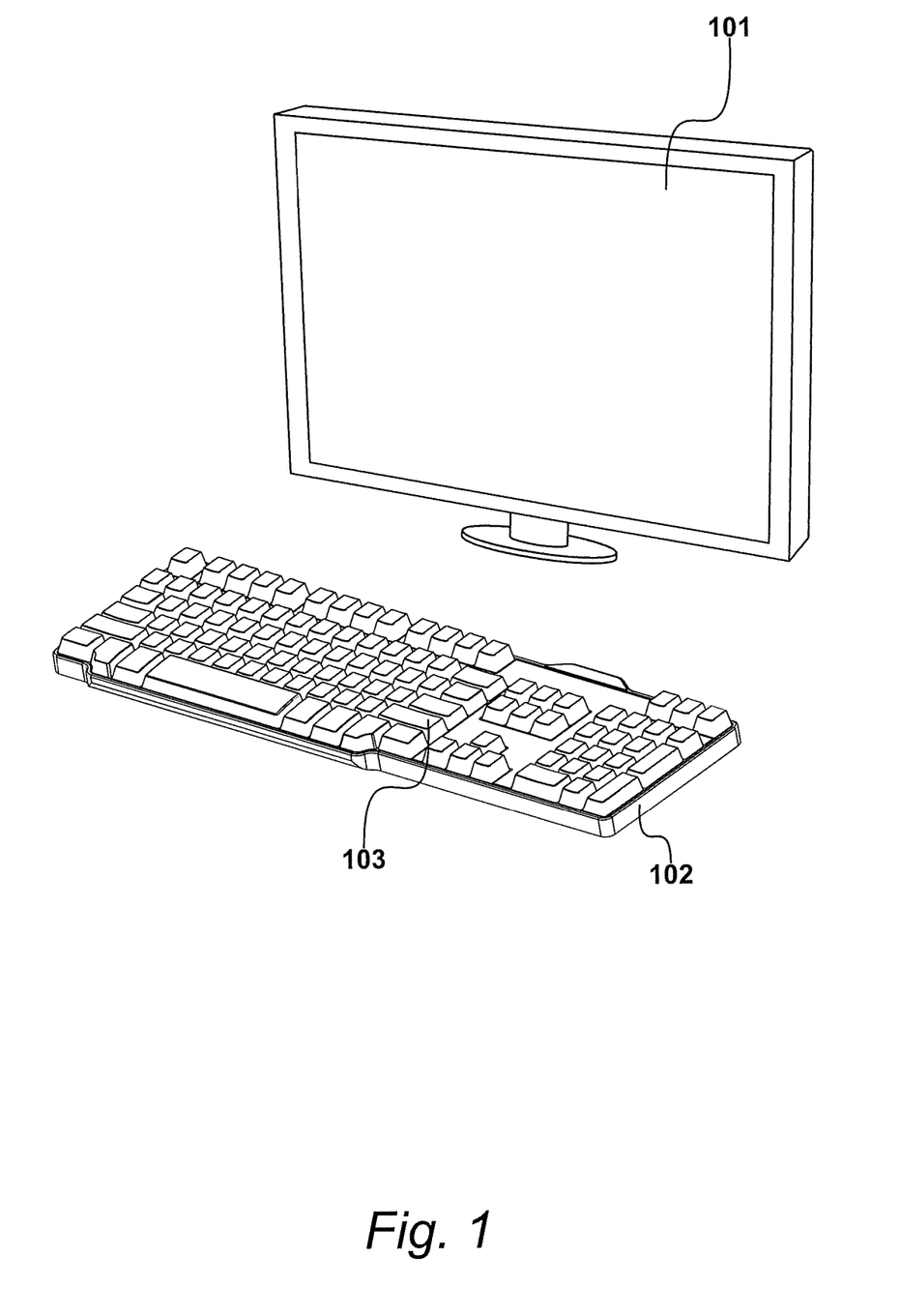
FIG. 1 shows an example arrangement of an electronic device and keyboard in accordance with the present invention.

FIG. 1

FIG. 1 shows a typical electronic device 101 comprising a keyboard 102 in accordance with an embodiment of the present invention.

In the embodiment, electronic device 101 may be a desktop computer, a notebook computer, or any other suitable type of electronic device in which a keyboard may be utilized.

In an example practical application, electronic device 101 is a personal computer as shown, and, in an embodiment, game applications are configured to run on the personal computer. Consequently, a keyboard provided in accordance with the present invention allows a user to control the relative actions of a virtual character in such a game by operating keyboard 102 in accordance with the invention.

For example, if a user wishes to control a game character such that the character runs in the game at a high speed, the user can press a designated key, such as key 103, with a relatively high applied pressure, or hard key press. Alternatively, when a user wishes to control a game character to move more slowly, the user can tap designated key 103 lightly at a reduced applied pressure.

Figure 2:
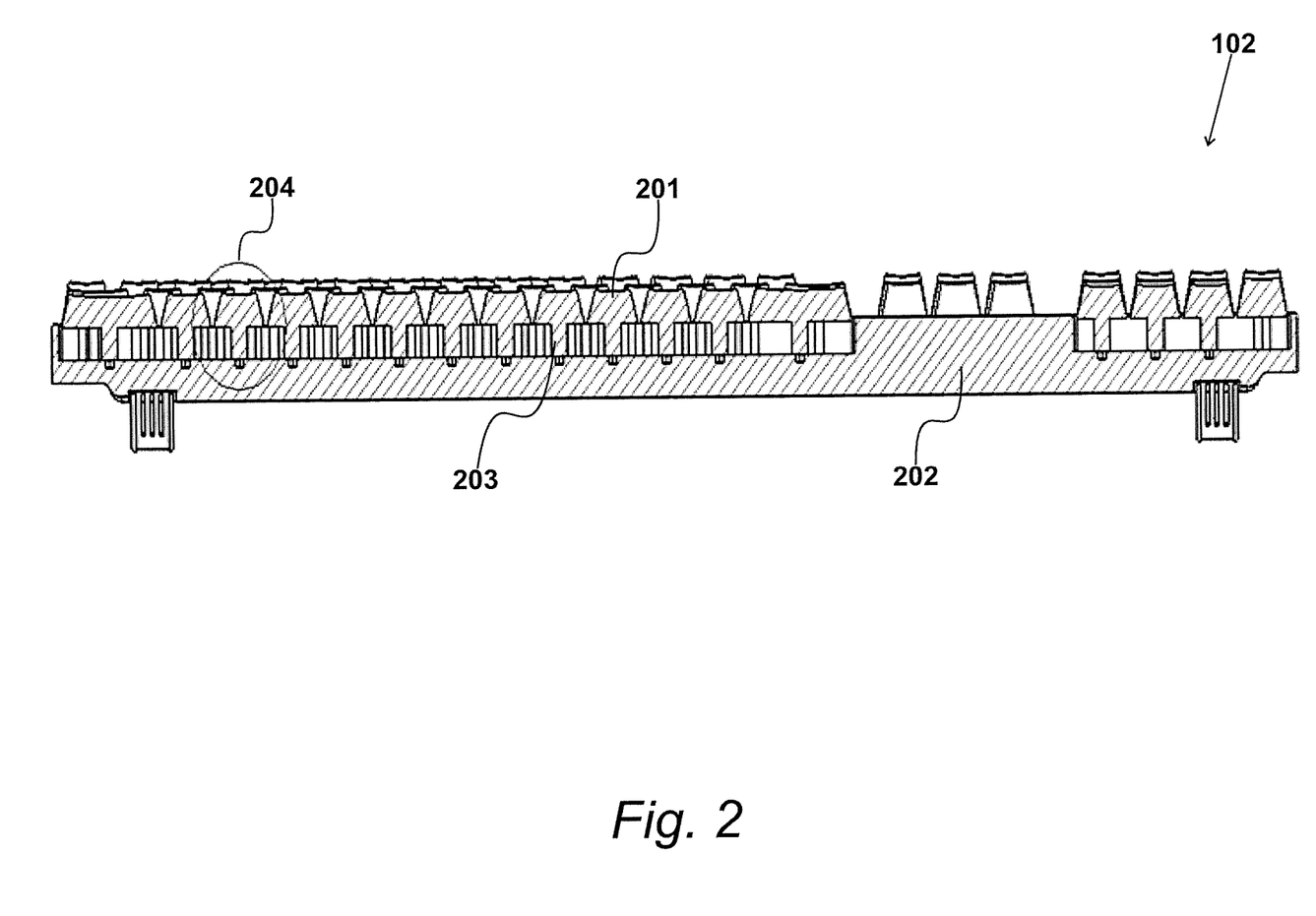
FIG. 2 shows a cross sectional view of the keyboard of FIG. 1 in accordance with the present invention.

FIG. 2

FIG. 2 shows a cross sectional view of keyboard 102 in accordance with the present invention. Keyboard 102 comprises a plurality of keys 201 arranged to enable a user to provide an input into electronic device 101, for example.

Keyboard 102 further comprises a cavity 203 which accommodates a circuit board, pressing layer and at least one pressure sensor in the manner which will be described further in FIG. 3, which illustrates a portion of keyboard 102 falling within area 203.

Figure 3:
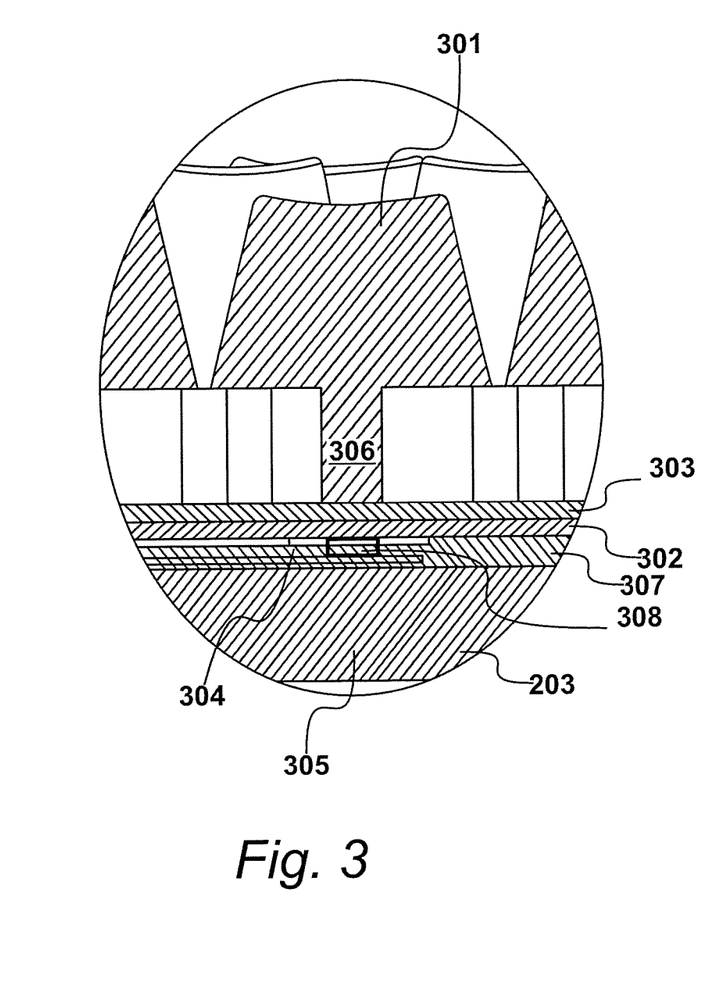
FIG. 3 shows a section of the keyboard of FIG. 2 presented in close-up detail.

FIG. 3

In this illustrated example, keyboard 102 comprises key 301, circuit board 302, pressing layer 303 and pressure sensor 304.

In the embodiment, pressure sensor 304 is provided between a lower portion 305 of cavity 203 and circuit board 302. Pressing layer 303 is moveably connected to key 301 and circuit board 302 is provided between pressing layer 303 and lower portion 305.

In the embodiment, pressure sensor 304 is electrically connected to circuit board 302, such that a force-receiving surface of pressure sensor 304 is aligned with a projection area 306 of key 301.

In the embodiment, keyboard 102 further comprises a support plate 307 arranged between lower portion 305 and circuit board 302.

As will be described further with respect to FIG. 8, keyboard 102 further comprises a force concentrator 308 which is bonded to circuit board 302 and positioned between circuit board 302 and lower portion 305 of keyboard cavity 203.

Figure 4:
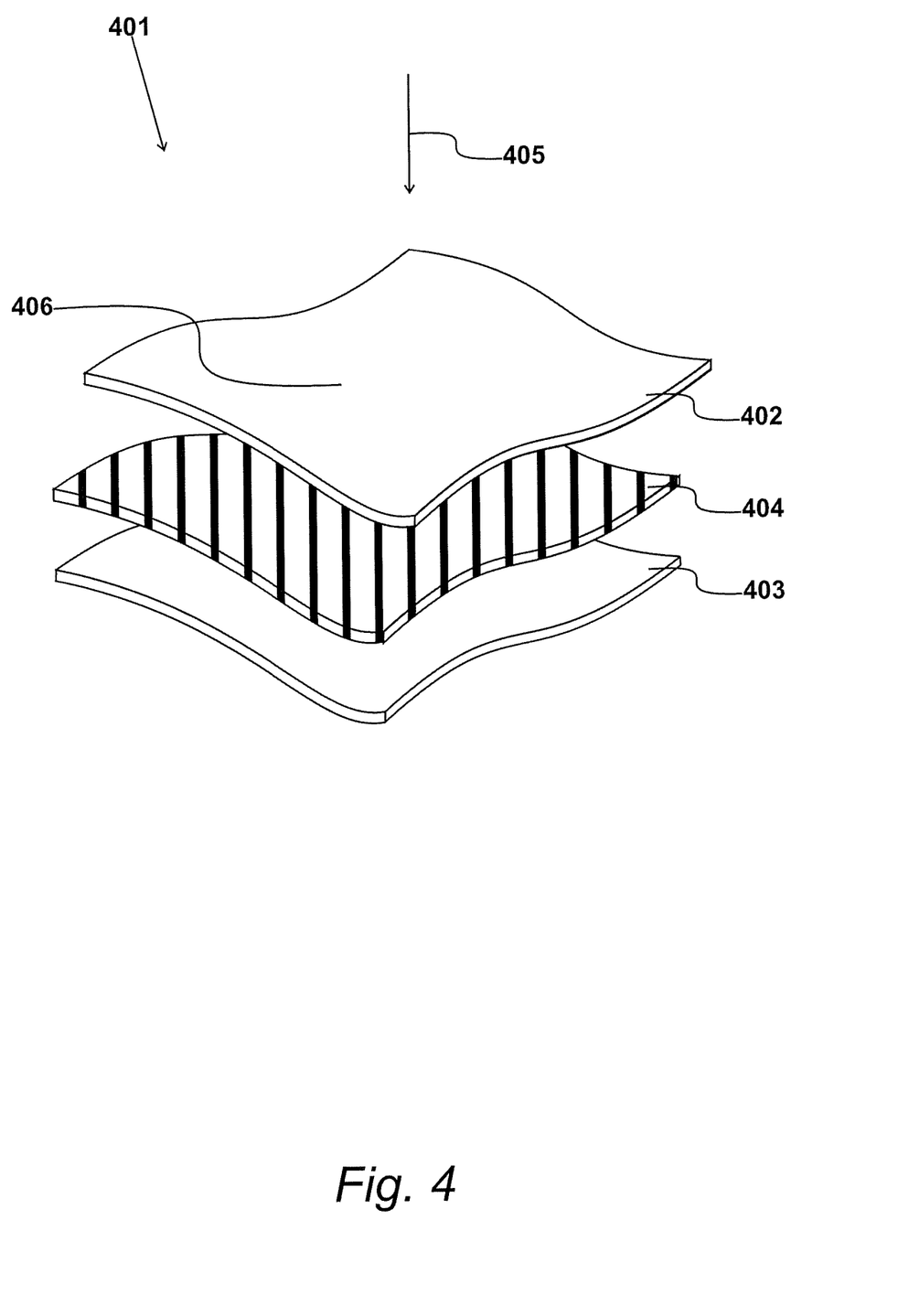
FIG. 4 shows an example pressure sensor utilized in a keyboard in accordance with the present invention.

FIG. 4

As shown in FIG. 4, any of the described pressure sensors herein, such as pressure sensor 304, may be substantially similar to pressure sensor 401 illustrated in FIG. 4. In the embodiment, pressure sensor 401 is a thin film pressure sensor.

In the embodiment, pressure sensor 401 comprises a first conductive layer 402, a second conductive layer 403 and an intermediate layer 404. Intermediate layer 404 is arranged between conductive layer 402 and conductive layer 403. In use, when intermediate layer 404 is brought into contact with the two conductive layers 402 and 403, intermediate layer 404, conductive layer 402 and conductive layer 403 form an electrical connection and pathway through the layers. In the embodiment, the layers may be brought into contact with each other by means of an applied force, such as applied force 405, onto a force-receiving surface 406 of pressure sensor 401.

In addition, when a detected pressure is different across the layers, the contact area between the intermediate layer and the two conductive layer layers is also different, that is, the resistance generated is also different, so that different pressures will produce different resistances.

Thus, when a key such as key 301 of keyboard 102 is pressed and pressure is transmitted via pressing layer 303, circuit board 302, and force concentrator 308, intermediate layer 404 of pressure sensor 401 is squeezed by the two conductive layers to form an electrical path thereby generating a corresponding resistance. Thus, detection of the applied pressure can be made.

In an embodiment, the number of keys 103 on keyboard 102 is greater than or equal to the number of pressure sensors 401 on keyboard 102.

In the embodiment of the present invention, and referring to the example of FIG. 3, one pressure sensor 304 is provided in the projection area 306 of each key 301 of the plurality of keys 201.

Figure 5:
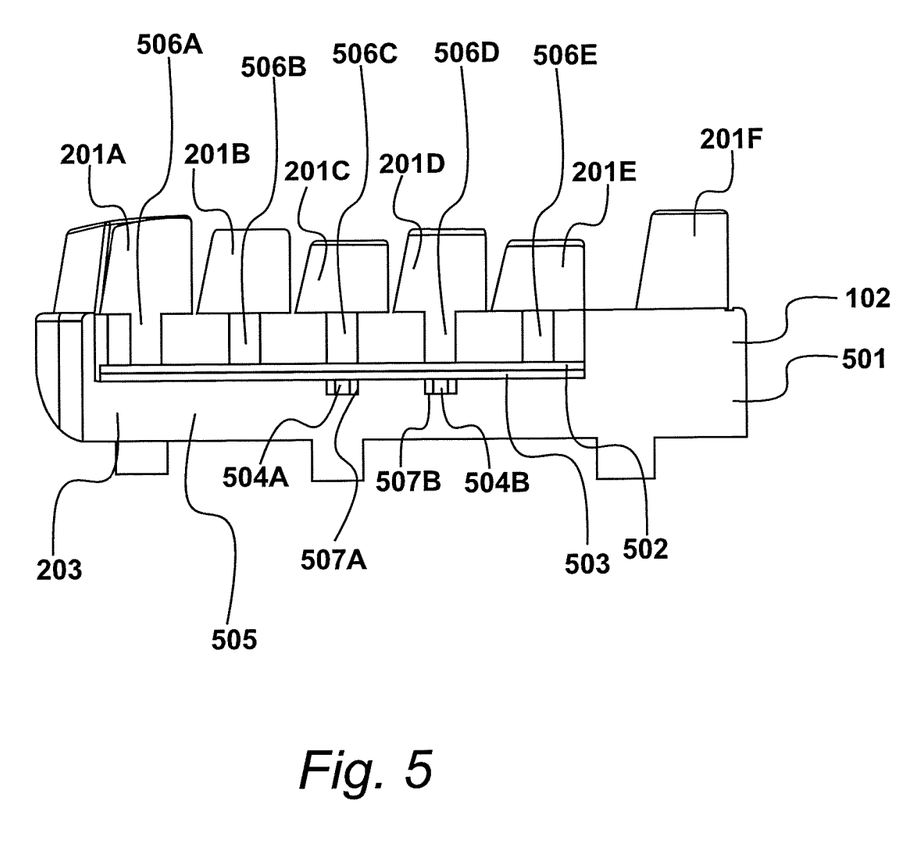
FIG. 5 shows a schematic structural diagram of a longitudinal section of a keyboard in accordance with an embodiment of the present invention.

FIG. 5

FIG. 5 shows a schematic structural diagram of a longitudinal section of keyboard 102 provided by an embodiment of the present invention.

Keyboard 102 comprises a plurality of keys 201, a housing 501, a pressing layer 502, a circuit board 503 and at least one pressure sensor 504.

In the embodiment, housing 501 comprises a cavity 203 which is configured to accommodate circuit board 503, pressing layer 502 and at least one pressure sensor 504. Thus, in the embodiment, circuit board 503, pressing layer 502 and the at least one pressure sensor 504 are all arranged in cavity 203.

The at least one pressure sensor 504 is arranged between a lower portion 505 of cavity 203 and circuit board 503. Each pressure sensor 504 is provided with a pressing layer 502 arranged on one side of circuit board 503, and a plurality of keys 201 are movably arranged on pressing layer 502.

In addition, each pressure sensor 504 is connected to circuit board 503, and the force-receiving surface (406) of each pressure sensor 504 is aligned with a projection area 506 of a corresponding key 201.

It is noted that lower portion 505 of housing 501 has a certain thickness and comprises at least one placement slot 507 which is provided in lower portion 505 facing circuit board 503. The position of each placement slot 507 corresponds to the projection area of a corresponding key 506. Each placement slot 507 is utilized for positioning each pressure sensor 504. In the embodiment, the cross-sectional area of each placement slot 507 is slightly larger than that of its corresponding pressure sensor 504. The depth of each placement slot 507 and the thickness of its corresponding pressure sensor 504 may be substantially similar.

In the embodiment of the present invention, when a user presses one of the plurality of keys 201, the pressing layer 502 is pressed to contact circuit board 503, and accordingly, circuit board 503 receives a signal in response to the user's applied press.

The magnitude of pressure generated by the user's pressing can also be transmitted to the pressure sensor in question through pressing layer 502 and circuit board 503. In this way, each pressure sensor 504 can detect a pressure signal and transmit this pressure signal to circuit board 503. Circuit board 503 can then transmit a contact signal to an electronic device, such as electronic device 101 of FIG. 1. Thus, the electronic device is configured to receive an input signal and a pressure signal such that the electronic device can perform corresponding processing in accordance with the contact signal and pressure signal.

By positioning pressure sensor 504 between lower portion 505 of cavity 203 and circuit board 503, pressure sensor 504 can be electrically connected to circuit board 503, and the corresponding pressure signal can be generated according to the pressure applied by a user pressing a key. In this way, the corresponding processing can be completed on the corresponding electronic device thereby improving the user experience and facilitating user operations.

Figure 6:
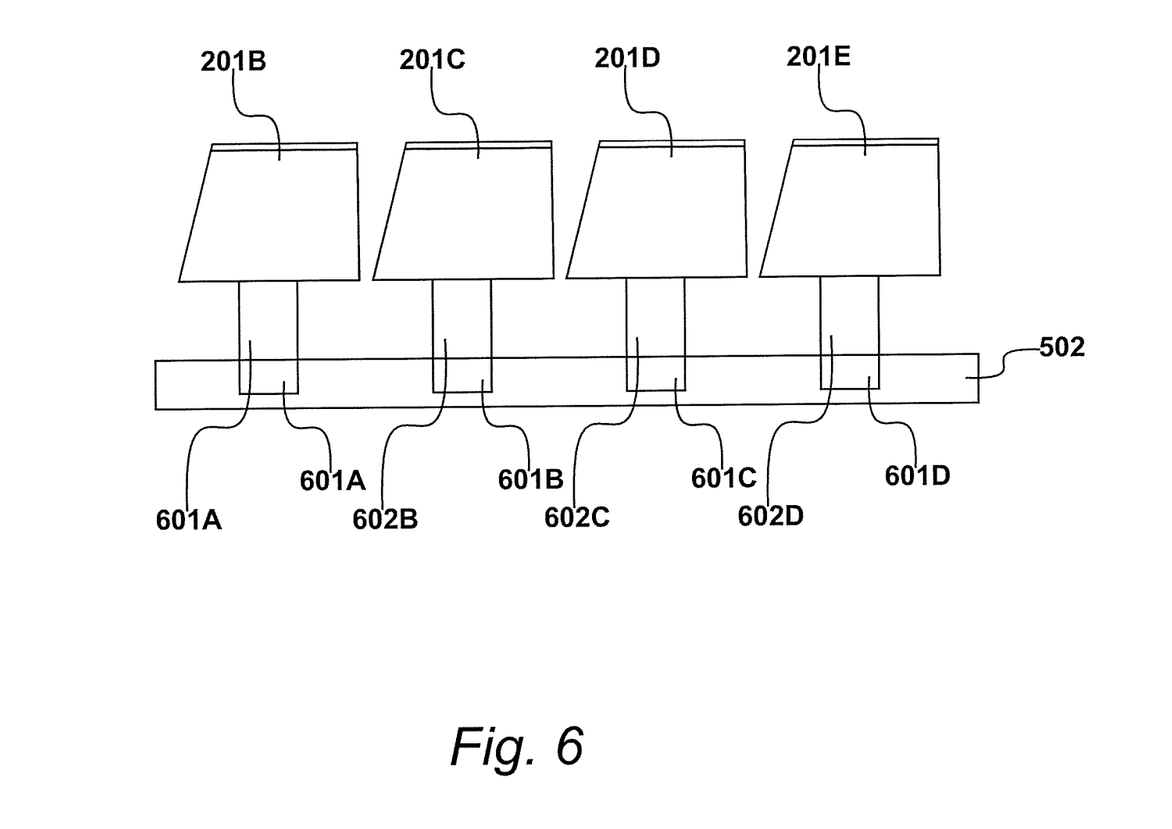
FIG. 6 shows a schematic diagram of a longitudinal cross-sectional structure of a key and pressing layer provided by the embodiment of FIG. 5.

FIG. 6

A schematic diagram of a longitudinal cross-sectional structure of a key 201 and pressing layer 502 provided by the embodiment of the present invention of FIG. 5 is shown in FIG. 6. As shown, pressing layer 502 is provided with a plurality of grooves 601. Each groove 601 is provided with a key 201, which is moveable within its respective groove 601.

In an embodiment, the number of grooves 601 and the number of keys 201 are substantially similar, and the area where the groove 601 is located overlaps and falls within the projection area of a corresponding key 201.

In the embodiment, each key 201 includes a connecting portion 602, and connecting portion 602 is disposed to the side of key 201 closest to pressing layer 502. The cross-sectional area of each connecting portion 602 is slightly smaller than the cross-sectional area of its corresponding groove 601. In an embodiment, the cross-sectional area of the connecting portion 602 and the cross-sectional area of its corresponding groove 601 is substantially similar.

Additionally, in the embodiment, the connection between each groove 601 and pressing layer 502 is a detachable connection. In a specific embodiment, the detachable connection is a snap connection.

In the embodiment, pressing layer 502 comprises an elastic material.

Figure 7:
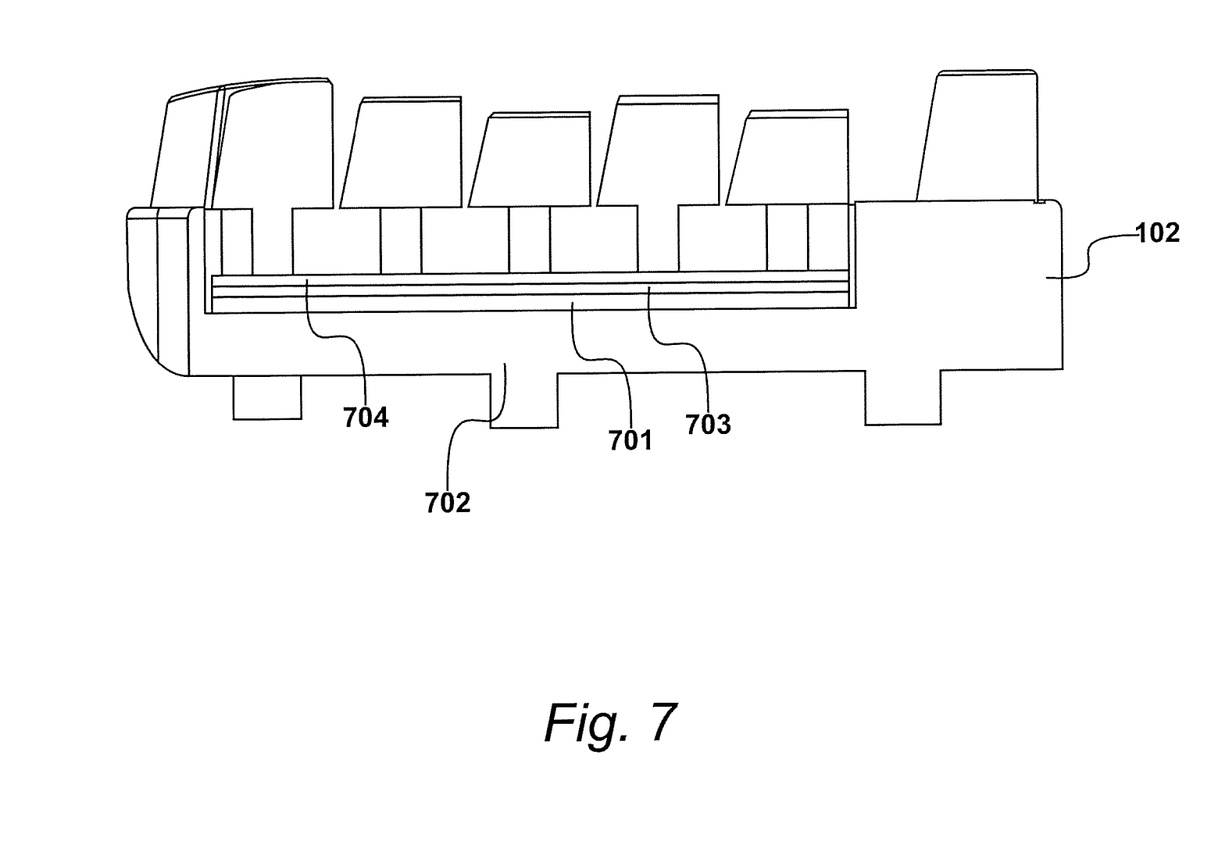
FIG. 7 shows a schematic longitudinal cross-sectional structure diagram of a keyboard in accordance with an alternative embodiment of the present invention.

FIG. 7

A schematic longitudinal cross-sectional structure diagram of a keyboard in accordance with an alternative embodiment of the present invention is shown in FIG. 7.

As shown, keyboard 102 comprises a support plate 701 arranged between the lower portion 702 of keyboard 102 and a circuit board 703. Support plate 701 is provided with at least one placement slot on a first side which faces circuit board 703. A pressure sensor is provided in each placement slot.

In the embodiment, support plate 701 has a thickness and the cross-sectional area of support plate 701, circuit board 703 and pressing layer 704 are substantially similar. Additionally, the cross-sectional shape of support plate 701, circuit board 703 and pressing layer 704 are also substantially similar.

Figure 8:
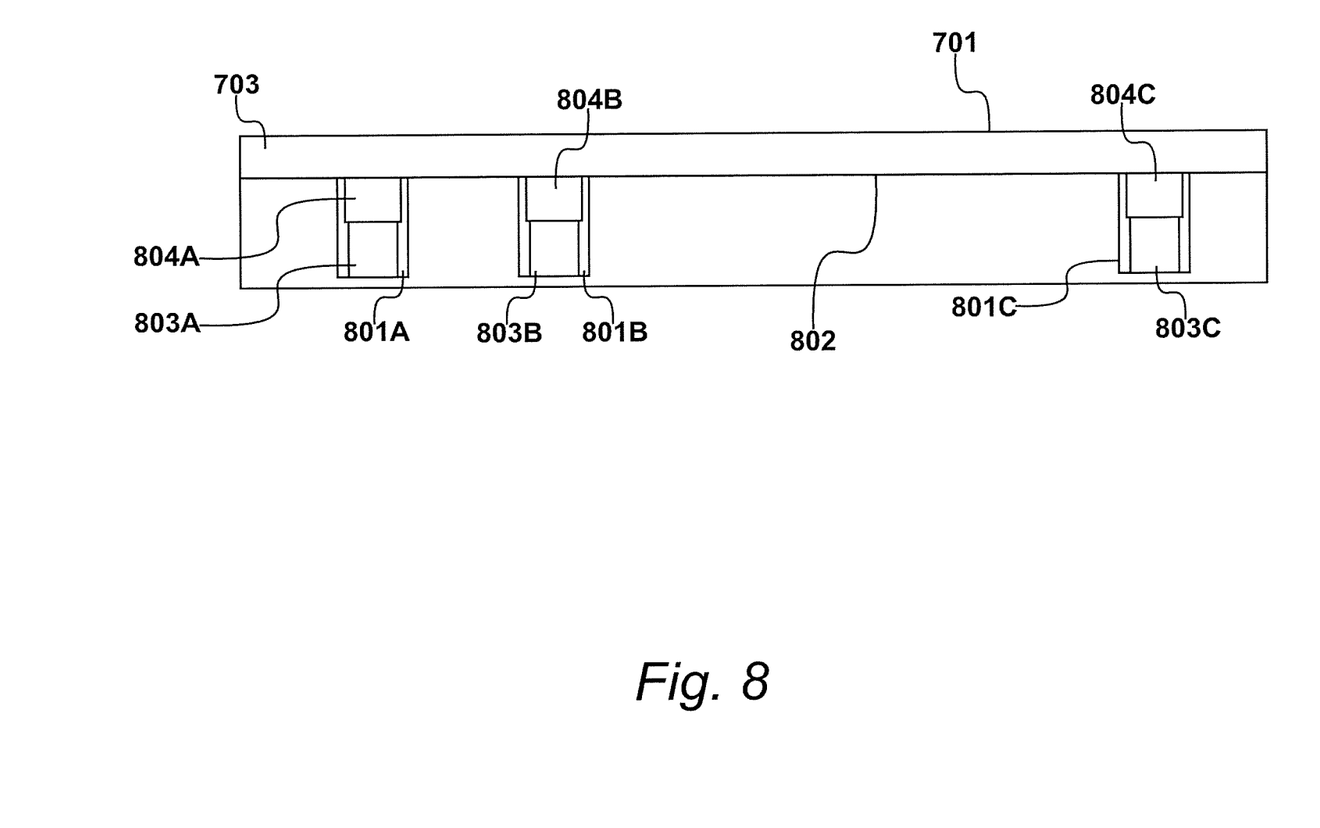
FIG. 8 shows a sectional structural diagram of a support plate and circuit board of FIG. 7.

FIG. 8

A longitudinal section structural diagram of a support plate 701 and a circuit board 703 in accordance with the embodiment of FIG. 7 is shown in FIG. 8.

As indicated in FIG. 7, support plate 701 is provided with at least one placement slot 801 on a first side 802 of the support plate 701 which faces circuit board 703. A pressure sensor 803 is provided in each placement slot 801.

In an embodiment, the cross-sectional shape of each placement slot 801 may be square, circular, or any other suitable geometric figure, which is not specifically limited in the embodiments of the present invention.

In a specific implementation, support plate 701 is provided with three placement slots 801. Correspondingly, a pressure sensor 802 is placed in each placement slot 801. In an embodiment, the projection area of each key 201 of keyboard 102 aligns with a corresponding placement slot 801. Thus, in this example embodiment, the projection area of a first key coincides with a first placement slot, the projection area of a second key coincides with a second placement slot, and the projection area of a third key coincides with a third placement slot.

Optionally, as shown in FIG. 8, keyboard 102 further comprises at least one force concentrator 804. In the embodiment, each placement slot 801 is provided with a force concentrator 804, and each force concentrator 804 is located between each pressure sensor 803 and circuit board 703. In an embodiment, force concentrator 804 is bonded to circuit board 703.

In the embodiment of the present invention, when a user presses a key 201, pressing layer 704 is brought into contact with circuit board 703. The applied pressure acts on circuit board 703, before transmitting through circuit board 703 and acting on force concentrator 804. Force concentrator 804 transmits the applied pressure to pressure sensor 803 such that pressure sensor 803 is able to detect the applied pressure.

In an embodiment, the cross-sectional area of force concentrator 804 and the cross-sectional area of pressure sensor 803 are substantially similar. In an alternative embodiment, the cross-sectional area of force concentrator 804 is larger than the cross-sectional area of pressure sensor 803 and smaller than the cross-sectional area of placement slot 801.

It is appreciated that in further embodiments, any suitable variation in cross-sectional area or size may be utilized to suit the specific application.

Optionally, force concentrator 804 comprises a polyester resin material such as PET (polyethylene terephthalate). However, it is appreciated that force concentrator 804 may comprise any other alternative material which facilitates the concentration of pressure.

In an embodiment, the total thickness of each pressure sensor 803 and its corresponding force concentrator 804 together is substantially similar to the depth of placement slot 801. It is noted that if the thickness of placement slot 801 is represented as a, the total thickness of pressure sensor 803 and force concentrator 804 together is represented as b, the difference between a and b can be determined as falling within a pre-set size range.

The present invention therefore provides an improvement over the prior art for the following reasons at least. Firstly, in the prior art of record, a signal generated from the keyboard is only generated when a key on the keyboard is actually pressed and is further only processed by the connected electronic device. The additional processing required in this case provides added inconvenience and a reduction in the user experience.

By positioning a pressure sensor between the bottom of the keyboard accommodating cavity and the circuit board, the pressure sensor is electrically connected to the circuit board, meaning the corresponding pressure signal can be generated according to a pressure applied by a user pressing the key in question. Thus, the corresponding processing can be completed on the corresponding electronic device.

Thus, the keyboard of the present invention not only satisfies the functions of existing keyboards, but also provides a force sensing element, thereby adding an extra degree of freedom for pressure inputs. This force-sensitive keyboard therefore enables users to have in-depth interaction with electronic devices, with increased simulation of real-world environments thereby improving the user experience.

The invention claimed is:
1. An electronic keyboard, comprising:
a plurality of keys; and
a housing comprising a cavity;
said cavity accommodating a circuit board, a pressing layer and at least one pressure sensor arranged in said cavity; wherein:
said at least one pressure sensor is provided between a lower portion of said cavity and said circuit board;
said pressing layer is moveably connected to each one of said plurality of keys and said circuit board is provided between said pressing layer and said lower portion;
said at least one pressure sensor is connected to said circuit board, and a force-receiving surface of each said at least one pressure sensor aligns with a projection area of a corresponding one of said plurality of keys;
said electronic keyboard further comprises a support plate arranged between said lower portion of said cavity and said circuit board; and
said support plate comprises at least one placement slot on a first side facing said circuit board, each said at least one placement slot including one of said at least one pressure sensors arranged therein.
2. The electronic keyboard of claim 1, wherein a plurality of grooves is provided on said pressing layer.

3. The electronic keyboard of claim 2, wherein each one of said plurality of keys is moveably received in a corresponding one of said plurality of grooves.

4. The electronic keyboard of claim 1, further comprising:
   at least one force concentrator configured to transmit an applied pressure to said at least one pressure sensor and located between said at least one pressure sensor and said circuit board.

5. The electronic keyboard of claim 4, wherein each said at least one force concentrator is arranged in a corresponding one of said at least one placement slot.

6. The electronic keyboard of claim 4, wherein said at least one pressure sensor comprises a first thickness and said at least one force concentrator comprises a second thickness, and a sum (b) of said first thickness and said second thickness is substantially similar to a depth (a) of said at least one placement slot.

7. The electronic keyboard of claim 4, wherein said at least one force concentrator comprises a polyester resin material.

8. The electronic keyboard of claim 1, wherein said at least one pressure sensor is a thin-film pressure sensor.

9. The electronic keyboard of claim 1, wherein said plurality of keys is a number greater than or equal to a number of said at least one pressure sensor.

10. The electronic keyboard of claim 1, wherein said pressing layer comprises an elastic material.

11. An electronic device, comprising the electronic keyboard of claim 1.

* * * * *